(12) United States Patent
Kim (10) Patent No.: US 9,094,179 B2
(45) Date of Patent: Jul. 28, 2015

(54) APPARATUS FOR PROVIDING MULTIMEDIA SERVICES AND METHOD THEREOF

(71) Applicant: Electronics and Telecommunications Research Institute, Daejeon (KR)

(72) Inventor: Seong Rag Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 13/720,365

(22) Filed: Dec. 19, 2012

(65) Prior Publication Data

US 2013/0188748 A1   Jul. 25, 2013

(30) Foreign Application Priority Data

Dec. 20, 2011 (KR) .................... 10-2011-0138404
Aug. 10, 2012 (KR) .................... 10-2012-0087811
Nov. 19, 2012 (KR) .................... 10-2012-0130780

(51) Int. Cl.

| H04L 1/00 | (2006.01) |
|---|---|
| H04L 1/06 | (2006.01) |
| H04L 1/08 | (2006.01) |

(52) U.S. Cl.

CPC .............. *H04L 1/0088* (2013.01); *H04L 1/007* (2013.01); *H04L 1/0048* (2013.01); *H04L 1/0089* (2013.01); *H04L 1/06* (2013.01); *H04L 1/08* (2013.01)

(58) Field of Classification Search
CPC .. H04B 7/0413; H04B 7/0452; H04L 1/0042; H04L 1/0003; H04L 1/0086; H04L 1/0088; H04L 1/0089; H04L 1/0098; H04L 1/06; H04N 19/00139; H04N 21/236; H04N 19/00133; H04N 19/00545; H04N 19/0078; H04N 21/2662; H03M 3/024; G06T 2207/00078
USPC ......... 375/146, 260, 267, 285, 295, 296, 240, 375/240.01, 240.02; 348/398.1, 397.1, 348/400.1; 382/232, 239
See application file for complete search history.

(56) References Cited

U.S. PATENT DOCUMENTS

| 8,300,705 B2 * | 10/2012 | Lee et al. ................. 375/240.26 |
| 2008/0013620 A1 | 1/2008 | Hannuksela et al. |
| 2009/0006927 A1 * | 1/2009 | Sayadi et al. ................. 714/762 |
| 2009/0219990 A1 * | 9/2009 | Han et al. ................. 375/240.02 |
| 2011/0103498 A1 * | 5/2011 | Chen et al. .................... 375/260 |
| 2013/0145239 A1 * | 6/2013 | Pi et al. ......................... 714/807 |

FOREIGN PATENT DOCUMENTS

| KR | 10-2004-0027219 | 4/2004 |
| KR | 10-2011-0097680 | 8/2011 |

* cited by examiner

Primary Examiner — Dac Ha
(74) Attorney, Agent, or Firm — Nelson Mullins Riley & Scarborough LLP (57) ABSTRACT

Provided are a transmitter and a receiver for providing a multi-layered multimedia service, and a method thereof. The transmitter includes: a Multiple Description Coding (MDC) unit configured to perform MDC on at least one source, and to output a description sequence for the at least one source; a Unequal Error Protection (UEP) grouping unit configured to output a UEP description sequence having a different number of description sequences constituting the description sequence according to a UEP level to which an importance level of the at least one source has been reflected; and a transmission code block processor configured to segment the UEP description sequence, to modulate each segmented UEP description sequence, and to generate a transmission block. Therefore, it is possible to ensure graceful degradation and scalability and provide a high-quality multimedia service.

5 Claims, 7 Drawing Sheets

FIG. 9

APPARATUS FOR PROVIDING MULTIMEDIA SERVICES AND METHOD THEREOF

CLAIM FOR PRIORITY

This application claims priority to Korean Patent Application Nos. 10-2011-0138404 filed on Dec. 20, 2011, 10-2012-0087811 filed on Aug. 10, 2012, and 10-2012-0130780 filed on Nov. 19, 2012 in the Korean Intellectual Property Office (KIPO), the entire contents of which are hereby incorporated by reference.

BACKGROUND

1. Technical Field

Example embodiments of the present invention relate in general to provision of multimedia services, and more specifically, to a transmitter and a receiver for providing a multi-layer multimedia service, and a method thereof.

2. Related Art

With the ultra-high speed of wireless networks and the Internet, video-based multimedia content services have been popularized in a broadcasting and telecommunication converged environment, such as video streaming, mobile broadcasting, IPTV, etc. In particular, with the introduction of mobile terminals such as smart phones, demands for mobile multimedia services are rapidly increasing.

Multimedia services require provision of various kinds of multimedia information having different information characteristics. Also, various kinds of terminals capable of using multimedia services and various kinds of service qualities capable of implementing for each terminal are provided.

In order to efficiently cope with such diversity, service scalability is needed. Also, in mobile broadcasting, since the states of channels continue to change, graceful degradation should be ensured in order to avoid abrupt degradation of service quality.

Since the transmitter of a broadcasting system has no information (kind of terminals, required service qualities, channel states, etc.) about terminals, it is difficult to provide multimedia services efficiently according to users' requirements.

That is, most of existing broadcasting systems have been designed in consideration of a terminal in the worst conditions. For example, eMBMS of 3GPP has adopted QPSK modulation and Single Input Single Output (SISO) transmission scheme having the lowest transmission efficiency in consideration of the case where a terminal has only one reception antenna and the channel state is very bad.

However, the approach has a problem that even though terminals having a plurality of reception antennas and being in a good channel environment can receive information at a high transmission rate, the terminals cannot receive high-quality multimedia services due to a limited amount of transmission information. Accordingly, in order to efficiently provide multimedia services, a transmitter has to provide high-quality multimedia services, and a terminal has to decide quality of service according to its performance and channel state.

Scalable video coding (SVC), which is a representative technique for ensuring scalability, has been adopted as a standard by many Standardization Organizations. In the SVC, an input signal is represented as multi-layer information having different information priorities.

Multimedia information encoded by the SVC scheme is mainly transmitted by a layered modulation (LM)-based transmission method. In the LM-based transmission method, a modulated base layer and an enhanced layer are transmitted at the same time. For example, AT-DMB and MediaFLO use 16QAM to transmit a modulated base layer and an enhanced layer at the same time. However, in the case of transmitting two or more layers, reception performance is degraded due to an increase of inter-layer interference. Also, in the LM-based transmission method, coverage rapidly decreases since power allocated to the base layer is reduced as the number of layers increases.

A transmitter that provides high-quality multimedia services is required to transmit information at high speed, and for fast transmission, it is suitable that a Multiple Input Multiple Output (MIMO) technology is used. In order to transmit information according to the MIMO technology, the number of reception antennas is required to be equal to or more than the number of transmission antennas. However, in conventional mobile broadcasting, in many cases, since the number of reception antennas of a terminal is less than the number of transmission antennas of a base station, it is difficult to use the MIMO technology.

SUMMARY

Accordingly, example embodiments of the present invention are provided to substantially obviate one or more problems due to limitations and disadvantages of the related art.

Example embodiments of the present invention provide a transmitter and a receiver for providing multimedia services while ensuring graceful degradation and scalability.

Example embodiments of the present invention also provide a method of providing multimedia services while ensuring graceful degradation and scalability.

In some example embodiments, there is provided a transmitter of providing a multimedia service in a multimedia service providing apparatus, including: a Multiple Description Coding (MDC) unit configured to perform MDC on at least one source, and to output a description sequence for the at least one source; a Unequal Error Protection (UEP) grouping unit configured to output a UEP description sequence having a different number of description sequences constituting the description sequence according to a UEP level to which an importance level of the at least one source has been reflected; and a transmission code block processor configured to segment the UEP description sequence, to modulate each segmented UEP description sequence, and to generate a transmission block.

The transmitter may further include an antenna mapping unit configured to duplicate the transmission block, to generate a plurality of the same transmission blocks, and to map the respective transmission blocks to at least one transmission antenna.

The MDC unit may perform MDC on the at least one source in unit of a sub layer that is divided into a base layer and at least one enhanced layer.

The transmitter may further include a systematic raptor coding unit configured to perform systematic raptor coding on each description sequence output from the MDC unit.

The transmission code block processor may include: a code block segmenting unit configured to segment each UEP description sequence output from the UEP grouping unit to one or more code blocks; a Cyclic Redundancy Check (CRC) attaching unit configured to attach a CRC code to each code block; a channel coding unit configured to perform channel coding for each code block to which the CRC code has been attached, and to output a channel-coded code block; and a modulator configured to modulate each code block output from the channel coding unit, and to generate the transmission block.

The transmitter may further include a pilot inserting unit configured to insert a pilot signal for each of the at least one transmission antenna.

In other example embodiments, there is provided a receiver of providing a multimedia service in a multimedia service providing apparatus, including: a Multi Input Multi Output (MIMO) decoding unit configured to receive a plurality of the same transmission blocks through at least one reception antenna, and to output a demodulated Log Likelihood Ratio (LLR) block which is a LLR block of the transmission block, in unit of a transmission block; a demodulated LLR block combining unit configured to combine the demodulated LLR block with the preceding demodulated LLR block, and to output an improved, demodulated LLR block; and a reception code block processor configured to perform channel decoding on the improved, demodulated LLR block, and to output a code block.

The MIMO decoding unit may include: a channel estimator configured to generate a channel estimated value using a pilot signal received through the at least one reception antenna, and to decide an execution order of MIMO detection; a transmission block regenerator configured to feed the improved, demodulated LLR block and the code block back from the demodulated LLR block combining unit and the reception code block processor, respectively, and to generate a regenerated transmission block using the improved, demodulated LLR block and the code block; and a MIMO detector configured to perform MIMO detection in unit of the transmission block with reference to the channel estimated value and the regenerated transmission block, and to output the demodulated LLR block.

The reception code block processor may include: a channel decoding unit configured to perform channel decoding on the improved, demodulated LLR block, and to generate a decode block; a CRC unit configured to receive the decode block, to check a CRC code of the decode block, and to determine whether reception has been successfully performed for each code block; and a code block buffer unit configured to remove the CRC code from the decode block, and to output the code block.

The receiver may further include: a received description restoring unit configured to receive the code block, and to reconstruct a description sequence; a systematic raptor decoding unit configured to perform systematic raptor decoding on each description sequence, and to output the resultant description sequence; and a multiple description decoding unit configured to perform multiple description decoding on the description sequence output from the systematic raptor decoding unit, and to restore at last one source.

The multiple description decoding unit may perform multiple description decoding on the at least one source in unit of a sub layer that is divided into a base layer and at least one enhanced layer.

In still other example embodiments, there is provided a receiving method of providing a multimedia service in a multimedia service providing method, including: receiving a plurality of the same transmission blocks through at least one reception antenna, and outputting a demodulated Log Likelihood Ratio (LLR) block which is a LLR block of the transmission block, in unit of a transmission block; combining the demodulated LLR block with the preceding demodulated LLR block, and outputting an improved, demodulated LLR block; and performing channel decoding on the improved, demodulated LLR block, and outputting a code block.

According to the transmitter of providing the multimedia service, according to the present embodiment, as described above, it is possible to provide a high-quality multimedia service using a plurality of transmission antennas regardless of the number of antennas of a receiver.

Also, the receiver of providing the multimedia service, according to the present embodiment, as described above, can decide the quality of a multimedia service by reflecting the performance of the reception terminal, power consumption, and a user's requirement when the number of reception antennas is insufficient and a channel state is poor.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "transmitter" used in the following description may include a base station, a Node-B, eNode-B, a base transceiver system (BTS), an access point, a relay, a femto-cell, etc. Also, the term "receiver" used in the following description may include a mobile terminal, a mobile station (MS), user equipment (UE), a user terminal (UT), a wireless terminal, an access terminal (AT), a terminal, a subscriber unit, etc.

Multiple description coding (MDC) has a characteristic capable of ensuring graceful degradation. That is, since the MDC represents a single piece of information as several descriptions in consideration of data loss during transmission, information can be restored with degraded quality although a part of the descriptions is received. In this case, distortion of information increases in proportion to the number of lost descriptions.

That is, scalable video coding (SVC) cannot ensure graceful degradation, and the MDC has no scalability. In order to overcome the problem, scalable MDC (or layered MDC) capable of ensuring both scalability and graceful degradation has been proposed.

The scalable MDC represents an input signal as a plurality of layers, and the individual layers may have different numbers of descriptions to represent information priorities.

For example, in the SVC or the scalable MDC, the lower layer has a higher information priority than the upper layer, and if the lower layer is not successfully received, the upper layer cannot be restored.

Accordingly, in order to efficiently transmit layer information having different information priorities, unequal error protection (UEP) transmission providing different levels of error protection according to information priorities is required. For the UEP transmission, a layered modulation (LM) transmission method may be used.

In an apparatus and method for providing multimedia services, according to the present embodiments, layers may be divided and transmitted, unlike the LM transmission method, in order to transmit information having different information priorities. Also, by differentiating a code rate, a modulation order, and a repetition number according to information priorities, the levels of error protection may be adjusted.

Hereinafter, embodiments of the present invention will be described in detail with reference to the appended drawings.

Figure 1:
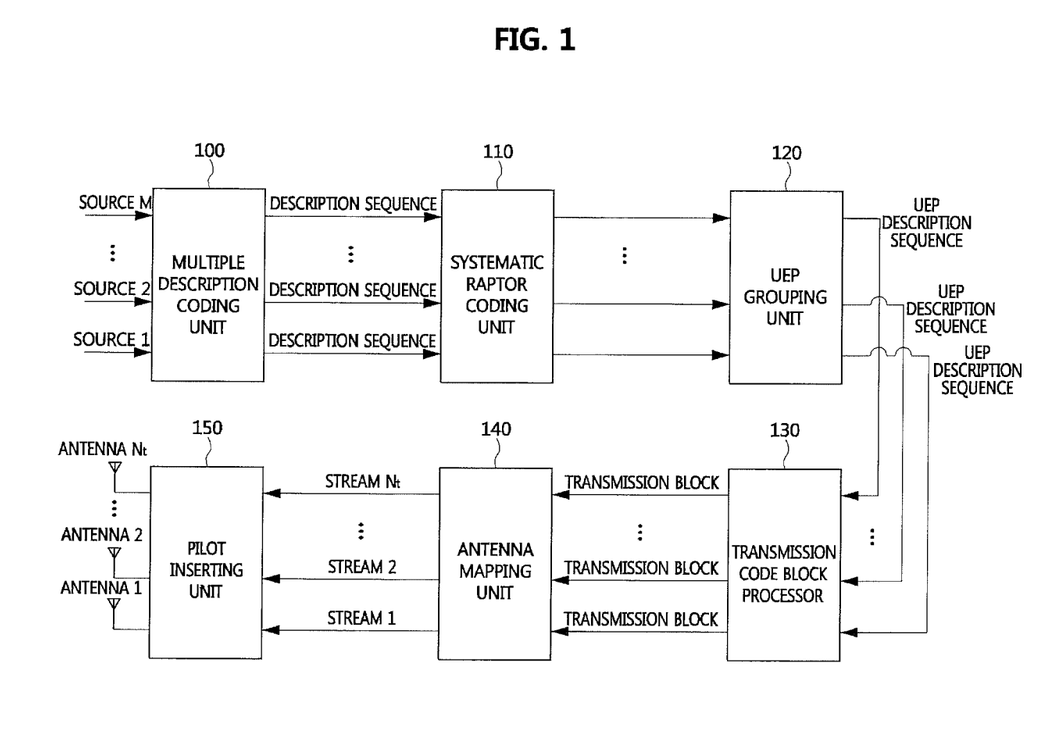
FIG. 1 is a block diagram illustrating the configuration of a transmitter according to an embodiment of the present invention.

FIG. 1 is a block diagram illustrating the configuration of a transmitter according to an embodiment of the present invention.

Referring to FIG. 1, the transmitter according to the embodiment of the present invention includes a MDC unit 100, a systematic raptor coding unit 110, an UEP grouping unit 120, a transmission code block processor 130, an antenna mapping unit 140, and a pilot inserting unit 150.

Hereinafter, in description of herein, the MDC unit 100, the systematic raptor coding unit 110, the UEP grouping unit 120, the transmission code block processor 130, the antenna mapping unit 140, and the pilot inserting unit 150 are shown as separate parts, however, they may be implemented as a single physical device or a single module. Also, the MDC unit 100, the systematic raptor coding unit 110, the UEP grouping unit 120, the transmission code block processor 130, the antenna mapping unit 140, and the pilot inserting unit 150 each may be implemented as a physical device, a plurality of physical devices forming no group, or a group.

The MDC unit 100 receives at least one source, and performs MDC on the source to output a plurality of description sequences. A multimedia service requires provision of various kinds of information having different characteristics. For example, the information may be information about the senses of smell and touch, as well as audio and (3D) video for reality services. Accordingly, the MDC unit 100 may include one or more MDC blocks for respectively encoding sources that are classified into various kinds of information.

For example, the number of descriptions configuring a description sequence of representing information of a frame may be adjusted according to the priority of the corresponding source. That is, the higher priority of information, the greater number of descriptions.

The respective MDC blocks may code sources with respect to different characteristics of information. Particularly, a scalable MDC block may code a source requiring scalability. For example, information requiring scalability may be video information. If only the base layer of video information is received, a low resolution of image is restored, and if all the base and enhanced layers of video information are received, a high resolution of image can be restored.

FIG. 1 shows the case where the transmitter provides a multimedia service configured with M sources.

The first source among the M sources that are input to the MDC unit 100 may require scalability. In this case, the first source is set to be input to a scalable MDC block.

A sub layer may be defined as a base layer and at least one enhanced layer. Accordingly, the MDC unit 100 may perform MDC on at least one source in unit of a sub layer that is divided into a base layer and at least one enhanced layer.

The MDC unit 100 may divide at least one source into a plurality of bit streams each called "description", and encode each description. The number of description sequences of the M-th source is defined to be $K_m$, wherein $K_m$ may include 1. That is, the scalable MDC block divides a source into a plurality of bit streams each called description, in unit of a sub layer, and encode each description.

The MDC unit 100 may output sources about information with the same characteristics, configuring multimedia, as a plurality of encoded description sequences (description data) having correlation. Thereby, even when a part of the plurality of encoded description sequences is lost, the sources can be restored with graceful degradation although there is distortion. Here, the description sequence may include at least one description.

Accordingly, the MDC unit 100 according to the embodiment of the present invention can implement both scalability and graceful degradation when a multimedia service is provided.

In more detail, SVC may implement scalability according to the performance of a receiver, and MDC may implement graceful degradation according to loss of transmission information. Also, SVC requires UEP transmission since there is a difference in importance between base layers and enhanced layers, whereas MDC requires no UEP transmission since there is no difference in importance between descriptions.

Accordingly, scalable MDC may overcome the problems of SVC that coverage is reduced, there are difficulties in MIMO transmission, and the number of layers is limited due to UEP transmission.

The systematic raptor coding unit 110 performs systematic raptor coding on each of the plurality of encoded description sequences output from the MDC unit 100. Also, the systematic raptor coding unit 110 may perform systematic raptor coding on each of encoded description sequences output for each sub layer from the scalable MDC coding block.

That is, the systematic raptor coding unit 110 may code description sequences so that description sequences lost during transmission can be restored. Also, the systematic raptor coding unit 110 may include one or more raptor coding blocks for coding the respective encoded description sequences.

For example, the systematic raptor coding unit 110 may output $N_m$ pieces of data from $K_m$ encoded description sequences for the M-th source. Here, it may be set that $C_m > K_m/N_m$, and $C_m > 1$. The systematic raptor coding unit 110 outputs the $K_m$ encoded description sequences as they are, and performs raptor coding on $(N_m - K_m)$ description sequences and outputs the results of the raptor coding.

In other words, systematic raptor coding performed by the systematic raptor coding unit 110 is to output $N_m$ pieces of data with respect to $K_m$ description sequences for a M-th source, in such a manner to output $(N_m - K_m)$ raptor-coded description sequences and $K_m$ description sequences as they are.

That is, the systematic raptor coding unit 110 outputs a plurality of description sequences as they are, and additionally outputs a predetermined number of raptor-coded description sequences.

Thereby, the transmitter according to the present embodiment may perform systematic raptor coding in order to reduce delays and power consumption due to raptor decoding at a receiver. Also, the transmitter may adjust the $N_m$ value according to the importance level of a source. The upper limit of the $N_m$ value is not specified, however, the upper limit of the $N_m$ value may need to be specified since the amount of transmission data increases as the $N_m$ value increases.

Also, the systematic raptor coding may be selectively performed.

The UEP grouping unit 120 may output UEP description sequences having different numbers of descriptions according to a UEP level to which the importance level of at least one source has been reflected.

For example, by adjusting the number of descriptions configuring a description sequence or adjusting the length of a description sequence, the importance level of source information may be represented. Thereby, it is possible to apply higher error protection to more important information upon transmission. That is, UEP is a technique of applying different degrees of error protection according to the importance level of information upon transmission.

The UEP grouping unit 120 may classify M input description sequences into P error protection levels according to the importance levels of the corresponding information in order to transfer UEP information to the following stage. That is, the UEP grouping unit 120 may represent source information having different importance levels by differentiating the number of descriptions configuring each description sequence or differentiating the length of each description sequence, and then transmit the resultant source information. Here, it may be P≤M.

Figure 2:
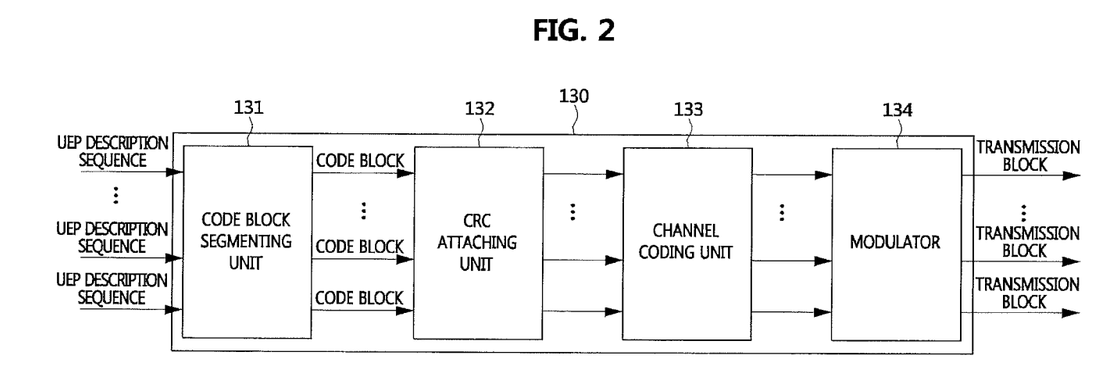
FIG. 2 is a block diagram illustrating the configuration of a transmission code block processor shown in FIG. 1.

FIG. 2 is a block diagram illustrating the configuration of the transmission code block processor 130 shown in FIG. 1.

Referring to FIG. 2, the transmission code block processor 130 includes a code block segmenting unit 131, a CRC attaching unit 132, a channel coding unit 133, and a modulator 134. The transmission code block processor 130 may segment and modulate the UEP description sequences, and generate transmission blocks.

The transmission code block processor 130 may segment each UEP description sequence into code blocks, and process the code blocks so that a receiver can check whether transmission is successful and correct transmission errors for each code block.

Also, the transmission code block processor 130 may modulate each code block and output a transmission block. That is, the transmission code block processor 130 may segment and modulate the UEP description sequences output from the UEP grouping unit 120, and output transmission blocks.

The code block segmenting unit 131 segments each UEP description sequence output from the UEP grouping unit 120 into code blocks in consideration of a code rate and a modulation order. That is, the code block segmenting unit 131 may segment each UEP description sequence into a plurality of code blocks each having a smaller unit than the UEP description sequence. For example, if a UEP description sequence is segmented into $B_m$ code blocks, the M-th source may be segmented into a total of $1.5 N_m \times B_m$ code blocks.

The CRC attaching unit 132 attaches a CRC code to each code block. The CRC may mean a method of using a cyclic binary code to detect errors generated upon data transmission.

That is, if the transmitter segments data in unit of a block, attaches a cyclic code obtained by specific calculation of a binary polynominal, to each block at the tail, and transmit the resultant block, a receiver checks whether the same cyclic code is obtained by the same calculation to thereby determine whether transmission is successful.

Accordingly, the CRC attaching unit 132 may allow a receiver to check whether each code block has been successfully transmitted.

The channel coding unit 133 performs channel coding on each code block to which a CRC code has been attached, and outputs the result of the channel coding. Particularly, the channel coding unit 133 may encode each code block such that errors generated upon transmission of data can be corrected as well as detected. For example, the channel coding unit 133 may use forward error correction.

The modulator 134 may modulate each code block output from the channel coding unit 133 to generate a symbol, thereby outputting a transmission block. The modulator 134 may modulate Q successive coded bits of a code block for each code block to generate a symbol, and transmit a transmission block. For example, in QPSK, the Q value may be 2, and in 16QAM, the Q value may be 4. That is, the modulator 134 can improve spectral efficiency (bits/Hz) by transmitting a symbol instead of Q bits, wherein the greater the Q value, the higher the spectral efficiency.

Figure 3:
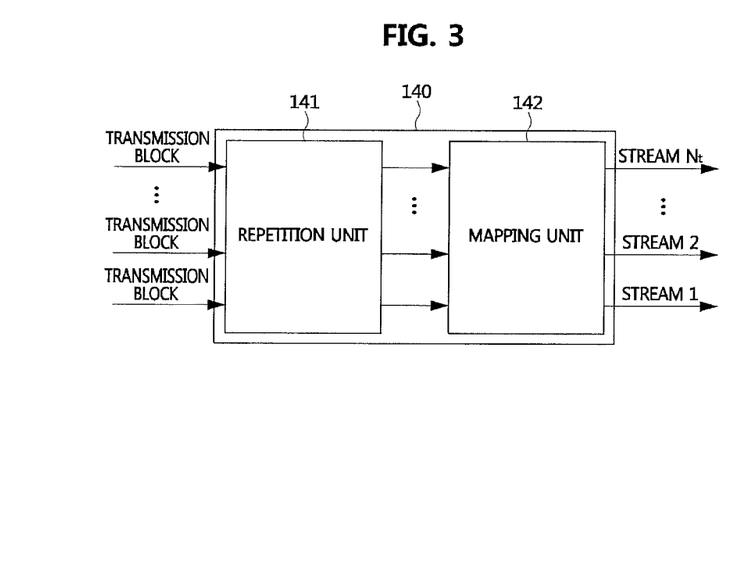
FIG. 3 is a block diagram illustrating the configuration of an antenna mapping unit shown in FIG. 1.

FIG. 3 is a block diagram illustrating the configuration of the antenna mapping unit 140 shown in FIG. 1.

Referring to FIG. 3, the antenna mapping unit 140 includes a repetition unit 141 and a mapping unit 142. The antenna mapping unit 140 may generate a plurality of the same transmission blocks by duplicating the transmission block, and map the individual transmission blocks to at least one transmission antenna.

For example, the antenna mapping unit 140 may map the transmission blocks to $N_t$ transmission antennas, and thus transmit $N_t$ streams.

The repetition unit 141 may generate the plurality of the same transmission blocks by performing repetition with respect to the transmission block, and the mapping unit 142 may map each of the transmission blocks in at least one transmission antenna.

For example, the repetition unit 141 may duplicate for each transmission block output from the transmission code block processor 130 by a predetermined number $R_m$ of times, and output the corresponding number of the same transmission blocks. Also, by adjusting the predetermined number $R_m$ of times, the UEP can be differentiated.

In the case of the M-th source, by performing duplication by the predetermined number $R_m$ of times, $1.5N_m \times R_m$ transmission blocks may be output. Accordingly, if a receiver successively receives at least one of the $R_m$ transmission blocks, the repetition unit 141 can restore the corresponding description sequence. Also, in order to ensure stable reception performance, the $R_m$ transmission blocks may be transmitted through independent paths or resources (time, frequency, antenna, etc.) as possible.

The mapping unit 142 may perform one-to-one antenna mapping. That is, the mapping unit 142 enables 1.5×R description sequences for a source to be transmitted through independent radio resources (time or frequency) in order to increase diversity gain.

For example, in order to increase diversity gain, transmission blocks corresponding to the same source are positioned temporally and spatially distant from each other, thereby increasing independency.

Also, the mapping unit 142 enables transmission blocks for the same description sequence to be transmitted using a radio resource (time or frequency) having the same characteristics through the same antenna, in order to provide the characteristics of an erasure channel in unit of a description sequence. If a transmitted packet (a code block or a description sequence) is lost during transmission due to noise, interference, congestion, system failure, etc., it can be considered as an erasure channel.

Also, the transmitter may further include the pilot inserting unit 150. The pilot inserting unit 150 may insert a pilot signal for each transmission antenna so that a receiver can estimate a MIMO channel.

Figure 4:
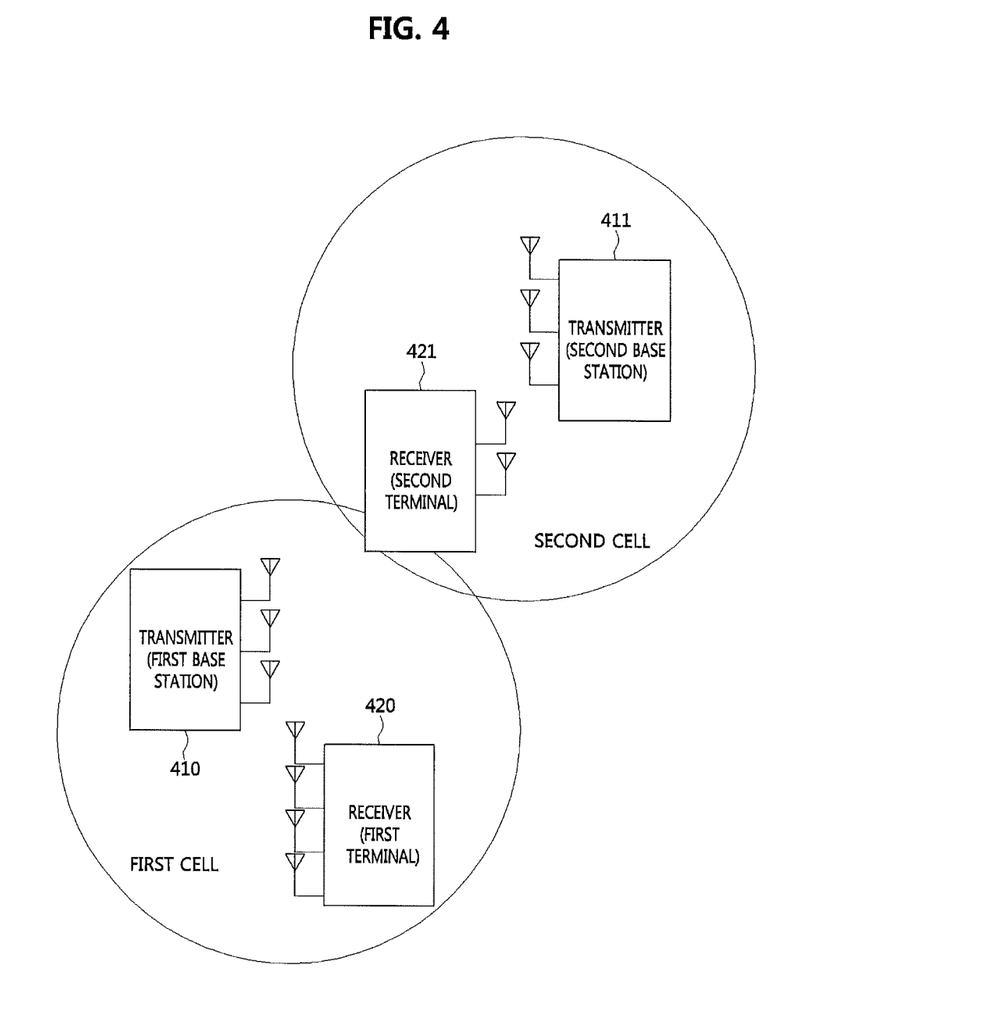
FIG. 4 is a conceptual view for describing an environment where a transmitter and a receiver according to embodiments of the present invention operate.

FIG. 4 is a conceptual view for describing an environment where a transmitter and a receiver according to embodiments of the present invention operate.

Referring to FIG. 4, a first base station 410 and a second base station 411 transmit signals through three transmission antennas. Each of the first base station 410 and the second base station 411 may be a transmitter according to an embodiment of the present invention. The first base station 410 forms a first cell, and the second base station 411 forms a second cell.

The first and second base stations 410 and 411 may transmit independent signals, or may cooperate to transmit the same signal. When cooperative broadcasting is done, the two base stations 410 and 411 may perform the same transmission function in order to generate the same transmission signal.

A first terminal 420 which belongs to the first cell may receive signals from the first base station 410, and consider signals transmitted from the second base station 411 as noise. A second terminal 421, which is located closer to the second base station 411 although it is located between the first cell and the second cell, receives signals from the second base station 411 and considers signals transmitted from the first base station 410 as noise.

Also, if the two base stations 410 and 411 perform cooperative broadcasting of transmitting the same signal, the two base stations 410 and 411 may increase reception efficiency by coherent-combining two signals from themselves.

There are the cases where base stations have the same number of transmission antennas, and terminals have different numbers of reception antennas. The first terminal 420 having 4 reception antennas and the second terminal 421 having 2 reception antennas may receive signals transmitted from a base station having 3 transmission antennas.

Figure 5:
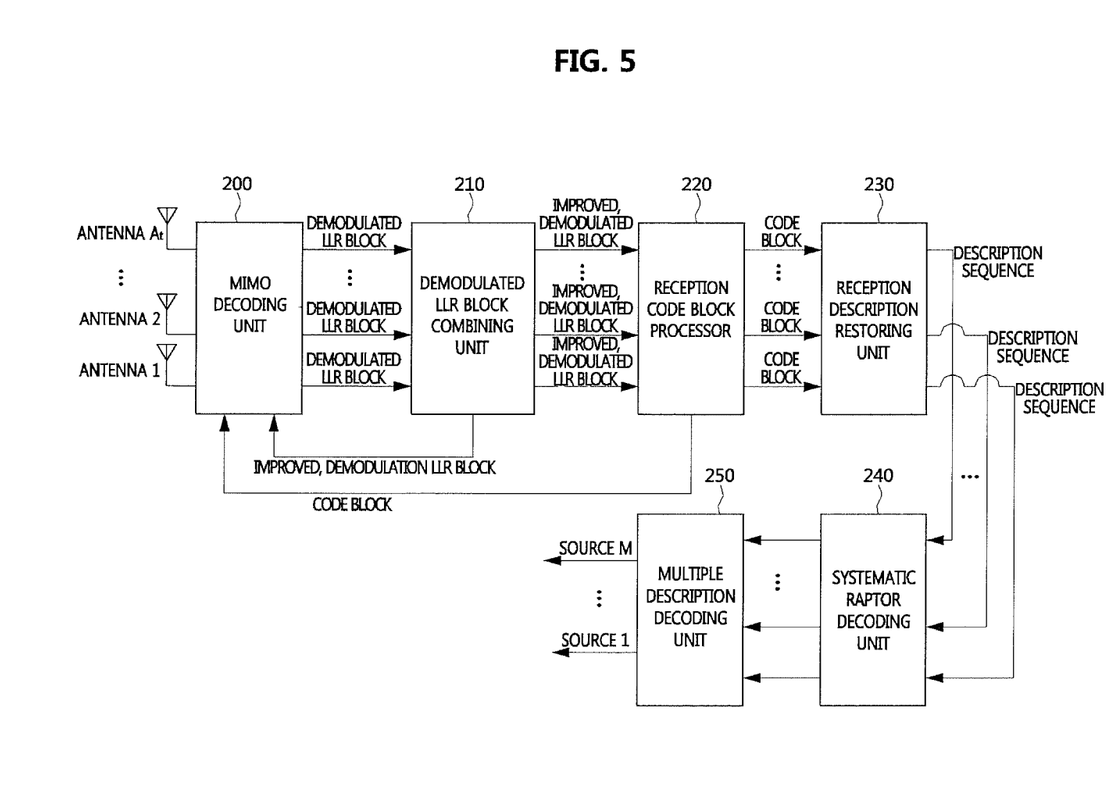
FIG. 5 is a block diagram illustrating the configuration of a receiver according to an embodiment of the present invention.

FIG. 5 is a block diagram illustrating the configuration of a receiver according to an embodiment of the present invention.

Referring to FIG. 5, the receiver includes a MIMO decoding unit 200, a demodulated Log Likelihood Ratio (LLR) block combining unit 210, a reception code block processor 220, a received description restoring unit 230, a systematic raptor decoding unit 240, and a multiple description decoding unit 250.

Hereinafter, in description of herein, the MIMO decoding unit 200, the demodulated LLR block combining unit 210, the reception code block processor 220, the received description restoring unit 230, a systematic raptor decoding unit 240, and a multiple description decoding unit 250 are shown as separate parts, however, they may be implemented as a single physical device or a single module. Also, the MIMO decoding unit 200, the demodulated LLR block combining unit 210, the reception code block processor 220, the received description restoring unit 230, a systematic raptor decoding unit 240, and a multiple description decoding unit 250 each may be implemented as a physical device, a plurality of physical devices forming no group, or a group.

The receiver according to the present embodiment may receive signals in unit of a transmission block, and perform decoding, etc. on the received signals to restore information. The receiver may have $A_r$ reception antennas. That is, a transmitter may transmit signals mapped to transmission antennas in unit of a transmission block, and the receiver may receive the signals through the reception antennas.

The MIMO decoding unit 200 may receive a plurality of the same transmission blocks through at least one reception antenna, and output a decoded LLR block which is a LLR block of the transmission block in unit of a transmission block.

The decoded LLR block combining unit 210 may combine the decoded LLR block with the previous decoded LLR block, and output an improved, decoded LLR block. Also, the decoded LLR block combining unit 210 may feed the improved, decoded LLR block back to the MIMO decoding unit 200.

The reception code block processor 220 performs channel decoding on the improved, decoded LLR block, and output a code block. Also, the reception code block processor 220 may feed the code block back to the MIMO decoding unit 200.

The received description restoring unit 230 may receive the code block to reconstruct a description sequence, and the systematic raptor decoding unit 240 may perform systematic raptor decoding on the description sequence and output the result of the systematic raptor decoding.

Also, the multiple description decoding unit 250 may perform multiple description decoding on the description sequence output from the systematic raptor decoding unit 240, and restore at least one source.

Figure 6:
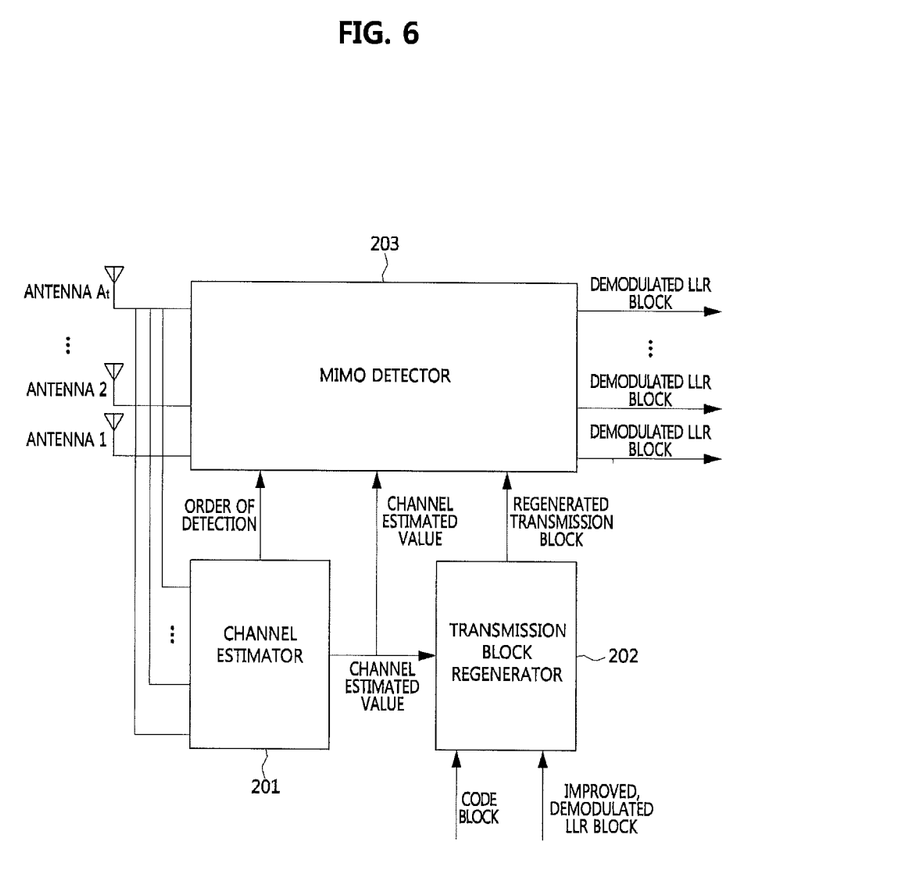
FIG. 6 is a block diagram illustrating the configuration of a Multi Input Multi Output (MIMO) decoding unit shown in FIG. 5.

FIG. 6 is a block diagram illustrating the configuration of the MIMO decoding unit 200 shown in FIG. 5.

Referring to FIGS. 5 and 6, the MIMO decoding unit 200 may receive a plurality of the same transmission blocks through $A_r$ reception antennas, and output a demodulated LLR block which is a LLR block of the transmission block in unit of a transmission block.

That is, the MIMO decoding unit 200 may receive a reception signal through at least one reception antenna in unit of a transmission block, and output a LLR block for each transmission block. Accordingly, the MIMO decoding unit 200 may output a LLR block in unit of a transmission block, and transfer the LLR block to the demodulated LLR block combining unit 210 which will be described later.

The MIMO decoding unit 200 includes a channel estimator 201, a transmission block regenerator 202, and a MIMO detector 203.

The channel estimator 201 may calculate a channel estimated value and decide an execution order of MIMO detection, using a pilot signal received through at least one reception antenna. That is, the channel estimator 201 may calculate a MIMO channel estimated value, using a pilot signal of a reception signal received through at least one reception antenna, in unit of a transmission block.

Also, the channel estimator 201 may decide an execution order of MIMO detection. For example, the channel estimator 201 may decide an execution order of MIMO detection in consideration of a channel state, a code rate, and a modulation order.

The transmission block regenerator 202 may receive an improved, demodulated LLR block and a code block fed back, and create a regenerated transmission block using the improved, demodulated LLR block and the code block.

That is, the transmission block regenerator 202 may regenerate a transmission block, using the improved, improved LLR block that is the output of the demodulated LLR block combining unit 210 and the code block that is the output of the reception code block processor 220.

For example, the transmission block regenerator 202 may regenerate a transmission block using the fed-back code block, the channel estimated value, and channel coding, modulation, etc. which the transmitter has used to form the corresponding transmission block.

Also, the transmission block regenerator 202 may perform hard decision on the improved, demodulated LLR block, and regenerate a transmission block using the channel estimated value and modulation, etc. which the transmission terminal has used to form the corresponding transmission block.

The MIMO detector 203 may output a demodulated LLR block through MIMO detection that refers to the regenerated transmission block in unit of a transmission block.

The MIMO detection may be performed in unit of a transmission block, and a MIMO detection method may be decided according to the output type of the transmission block regenerator 202.

First, MIMO detection based on a code block is described. It may be determined whether a transmission block has been successfully decoded during the period of the previous transmission block and stored in the reception code block processor 220. That is, it may be determined whether decoding has been successfully performed before decoding of each transmission block.

MIMO detection of a first transmission block in the period of a specific transmission block will be described.

In the case of non-cooperative broadcasting, a received signal according to a specific transmission block period has duplicated $N_t$ transmission blocks transmitted from a transmitter. MIMO detection with respect to the first transmission block may be performed by considering the remaining $(N_t-1)$ transmission blocks except for the corresponding transmission block as interference and performing Minimum Mean-Square-Error (MMSE) estimation to output a demodulated LLR block.

If it is determined that the demodulated LLR block has been successfully received through the demodulated LLR block combining unit 210 and the reception code block processor 220, MIMO detection with respect to the second transmission block may be performed.

Meanwhile, if it is not determined that the demodulated LLR block has been successfully received, MIMO detection with respect to the remaining transmission blocks may be stopped, and a bit for the demodulated LLR block of the corresponding transmission block may be replaced with "0."

The transmission block regenerator 202 may regenerate a first transmission block using a first code block successfully received. In MIMO detection with respect to the second transmission block, the regenerated first transmission block is removed, MMSE is performed, and then MIMO detection is performed to output a demodulated LLR block.

Also, the received signal from which the first transmission block has been removed may be stored. If it is determined that the second transmission block has been successfully received, MIMO detection with a third transmission block may be performed.

Accordingly, in MIMO detection with respect to a n-th transmission block, a (n−1)-th transmission block may be regenerated using a (n−1)-th code block that has been just successfully received when a received signal from which (n−2) transmission blocks have been removed has been stored in advance.

That is, in MIMO detection with respect to the n-th transmission block, a currently regenerated (n−1)-th transmission block may be removed from a received signal from which (n2) transmission blocks have been removed and which has been stored in advance, MMSE may be performed, and then MIMO detection may be performed. By sequentially performing the operations, MIMO detection with respect to $N_t$ transmission blocks may be performed.

Then, MIMO detection using an improved, demodulated LLR block may be described.

The MIMO detection using the improved, demodulated LLR block is the same as the MIMO detection using the code block, except for a difference as follows.

In the MIMO detection using the improved, demodulated LLR block, it is impossible to determine whether a transmission block has been successively received, since regeneration is performed before channel coding.

Accordingly, operation of determining whether a current transmission block has been successively received in the previous transmission block period is omitted. Also, since whether a transmission block on which MIMO detection has been currently performed has been successfully received cannot be determined, it is impossible to stop MIMO detection while the MIMO detection is being performed, and it is possible to perform MIMO detection on all of $N_t$ transmission blocks in a specific transmission block period, without any interruption.

Also, MIMO detection when several base stations cooperate for cooperative broadcasting is similar to MIMO detection when a single base station performs broadcasting, except for a difference as follows.

When several base stations perform cooperative broadcasting, since a received signal in a specific transmission block period includes duplicated transmission blocks from the base stations, interference of transmission signals from all the base stations may be removed from the received signal, using the regeneration outputs for transmission blocks from the respective base stations. Then, coherent combining is performed on the received signal from which interference has been removed, so that a signal with an improved Signal-to-Noise Ratio (SNR) may be generated.

Figure 7:
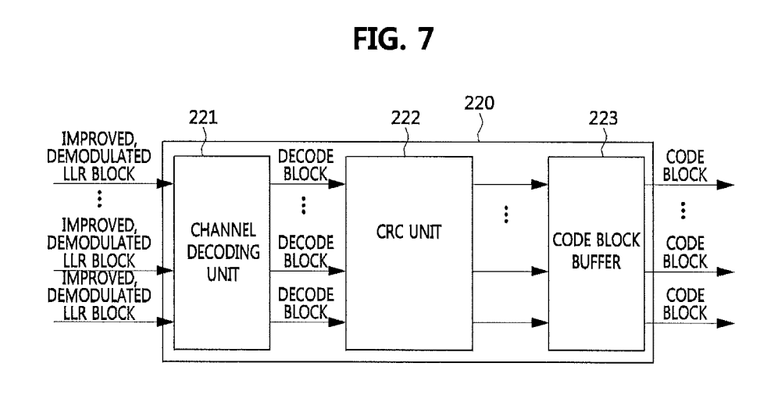
FIG. 7 is a block diagram illustrating the configuration of a reception code block processor shown in FIG. 5.

FIG. 7 is a block diagram illustrating the configuration of the reception code block processor 220 shown in FIG. 5.

Referring to FIG. 7, the reception code block processor 220 includes a channel decoding unit 221, a CRC unit 222, and a code block buffer 223.

The reception code block processor 220 may output a code block for each transmission block. Also, the reception code block processor 220 may correct transmission errors and determine whether transmission has been successfully performed for each code block.

The channel decoding unit 221 may perform channel decoding on an improved, demodulated LLR block to generate a decode block. That is, the channel decoding unit 221 may perform forward error correction using an improved, demodulated LLR block. Accordingly, the channel decoding unit 221 may generate a decode block decided through forward error correction.

The CRC unit 222 may receive the decode block, and check a CRC code to determine whether reception has been successfully performed for each code block.

The code block buffer 223 may remove the CRC code from the decode block to generate a code block, output and store the code block, and feed the code block back to the MIMO decoding unit 200.

Referring to FIG. 5 again, the received description restoring unit 230 reconstructs a description sequence using the code block. The received description restoring unit 230 may reconstruct, when receiving all code blocks configuring a description sequence, a description sequence using the code blocks. If the received description restoring unit 230 determines that any one of the received code blocks has an error, the received description restoring unit 230 may output the corresponding description to be reconstructed, as an erased description. The erased description cannot be used to restore a transmission description, but can represent information about which description has been erased.

The systematic raptor decoding unit 240 perform systematic raptor decoding on each description sequence. That is, the systematic raptor decoding unit 240 performs no raptor decoding if all description sequences not raptor-coded have been successfully received, and performs raptor decoding of sequentially adding raptor-coded description sequences if there is an erased description sequence among description sequences not raptor-coded, to thereby restore the erased description sequence. Accordingly, the systematic raptor decoding unit 240 may check whether any one of description sequences transmitted from a transmitter has been erased.

For example, in the case of a M-th source, the systematic raptor decoding unit 240 may check whether any one of $K_m$ description sequences has been erased. If all of the $K_m$ description sequences have been successfully received, the systematic raptor decoding unit 240 may output the $K_m$ description sequences without any modification, thereby reducing time delay and power consumption due to decoding. Also, if there is an erased description sequence among the $K_m$ transmission descriptions, raptor decoding is performed by adding description sequences on which raptor decoding has been performed. At this time, by adding description sequences on which raptor coding has been performed until all of the $K_m$ description sequences are successfully decoded, raptor decoding is performed. Also, the systematic raptor decoding unit 240 may include at least one raptor decoding block for performing raptor decoding for each description sequence.

The receiver according to the present embodiment further includes a multiple description decoding unit 250 for decoding description sequences output from the systematic raptor decoding unit 240 to restore at least one source. That is, the multiple description decoding unit 250 performs MDC-decoding on description sequences encoded by the multiple description coding unit 100 of a transmitter to restore a source. Also, in the case of a description sequence decoded in unit of a sub layer by a scalable MDC coding block of a transmitter, the multiple description decoding unit 250 may finally restore a upper layer of a restored description using a lower layer of the restored description. That is, the multiple description decoding unit 250 may perform multiple description decoding on at least one source in unit of a sub layer configured with a base layer and at least one enhanced layer. Accordingly, the multiple description decoding unit 250 may include one or more MDC decoding blocks capable of respectively decoding sources that are classified into various kinds of information, and a scalable MDC decoding block for decoding sub layer-based descriptions.

Figure 8:
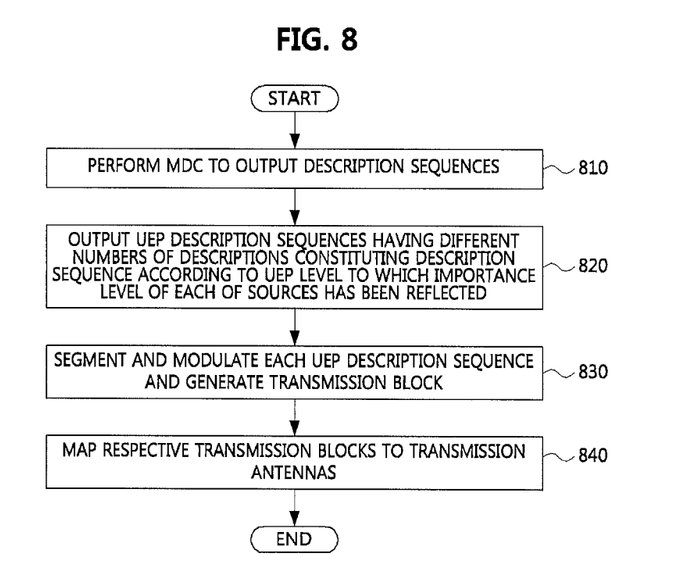
FIG. 8 is a flowchart illustrating a transmission method according to an embodiment of the present invention.

FIG. 8 is a flowchart illustrating a transmission method for providing a multimedia service, according to an embodiment of the present invention.

The transmission method according to the present embodiment performs multiple description encoding on at least one source, and duplicately transmits descriptions using one of various channel coding methods, thereby allowing broadcast MIMO transmission with graceful degradation.

Referring to FIG. 8, the transmission method includes: performing MDC to output description sequences (S810); reflecting the importance level of each source to output UEP description sequences (S820); generating transmission blocks (S830); and mapping the respective transmission blocks to transmission antennas (S840).

In operation S810, MDC may be performed on at least one source, and a description sequence for the at least one source may be output.

Also, in operation S810, the source may be subject to MDC in unit of a sub layer that is divided into a base layer and at least one enhanced layer.

Then, in operation S820, UEP description sequences having different numbers of descriptions according to a UEP level to which the importance level of the source has been reflected may be output.

In operation S830, each UEP description sequence may be divided into code blocks, a CRC code is attached to each code block, channel coding may be performed on each code block to which the CRC code has been attached, and the channel-coded code block may be output. Then, the channel-coded code block is modulated, so that a transmission block may be generated.

In operation S840, the transmission block may be duplicated to generate a plurality of the same transmission blocks, and the respective transmission blocks may be mapped to at least one transmission antenna. Also, a pilot signal may be inserted for each transmission antenna.

Also, the transmission method may further include operation of performing systematic raptor coding on each description sequence.

Figure 9:
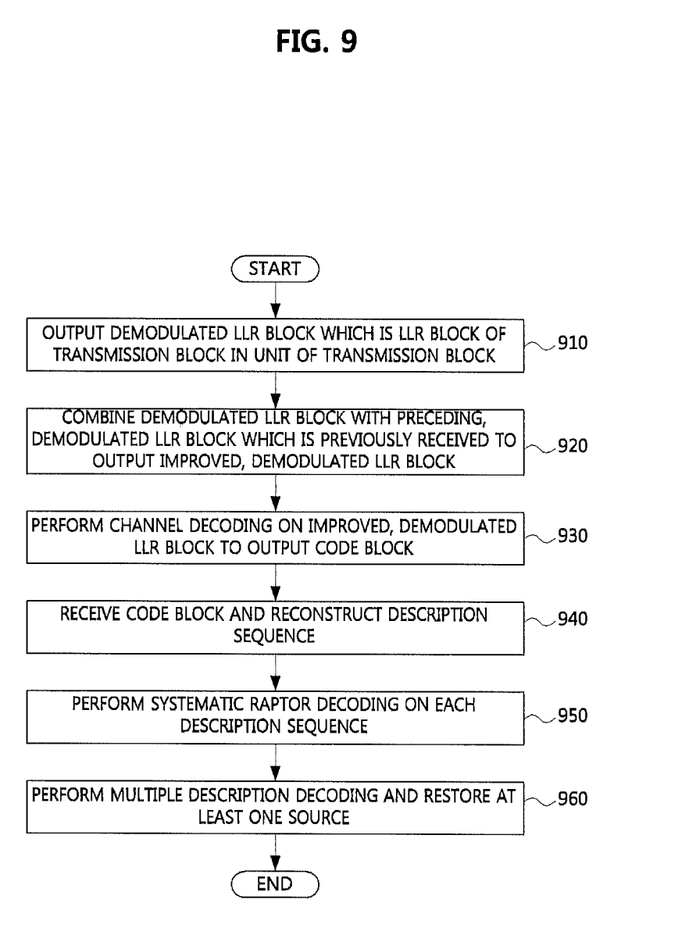
FIG. 9 is a flowchart illustrating a reception method according to an embodiment of the present invention.

FIG. 9 is a flowchart illustrating a reception method for providing a multimedia service, according to an embodiment of the present invention.

The reception method according to the present embodiment includes: outputting a demodulated LLR block (S910); outputting an improved, demodulated LLR block (S920); outputting a code block (S930); receiving the code block to reconstruct a description sequence (S940); performing systematic raptor coding (S950); and performing multiple description decoding (S960).

In operation S910, a plurality of the same transmission blocks may be received through at least one reception antenna, and a demodulated LLR block which is a LLR block of the transmission block may be output.

In detail, in operation S910, a channel estimated value may be created and an execution order of MIMO detection may be decided, using a pilot signal received through at least one reception antenna, an improved, demodulated LLR block and a code block fed back may be received, and a regenerated transmission block may be created using the improved, demodulated LLR block and the code block. Thereby, a demodulated LLR block may be output through MIMO detection that refers to the channel estimated value and the regenerated transmission block in unit of a transmission block.

In operation S920, the demodulated LLR block may be combined with the previous demodulated LLR block to output an improved, demodulated LLR block.

In operation S930, channel decoding may be performed on the improved, demodulated LLR block to generate a code block.

In detail, in operation S930, channel decoding may be performed on the improved, demodulated LLR block to generate decode blocks, and a CRC code is checked to determine whether reception has been successfully performed for each code block. Then, the CRC codes may be removed from the decode blocks to output code blocks.

In operation S940, the code blocks may be received to reconstruct description sequences. That is, description sequences may be restored through a combination of the code blocks.

In operation S950, systematic raptor decoding may be performed on each description sequence, and the resultant description sequences may be output.

In operation S960, multiple description decoding may be performed on the description sequences subject to systematic raptor decoding to restore at least one source. In operation S960, multiple description decoding may be performed on the at least one source in unit of a sub layer that is divided into a base layer and at least one enhanced layer.

The transmission method and the reception method as described above are performed by the transmitter and the receiver according to the embodiments of the present invention, respectively, and will be more clearly understood with reference to the above description related to the transmitter and the receiver.

The transmitter may duplicately transmit different description sequences using a plurality of antennas, and the receiver may perform reception according to its capability and channel state.

For example, a terminal having a great number of antennas and being in a good channel state receives all description sequences to restore a high-quality signal, and a terminal having a small number of antennas and being in a poor channel state restores a low-quality signal since it cannot receive a part of transmitted description sequences.

In this specification, the transmitter transmits signals through a plurality of transmission antennas, and the receiver has no limitation on the number of antennas, which may be called Multi Input Variable Output (MIVO) broadcasting.

While the example embodiments of the present invention and their advantages have been described in detail, it should be understood that various changes, substitutions and alterations may be made herein without departing from the scope of the invention.

What is claimed is:

1. A transmitter of providing a multimedia service in a multimedia service providing apparatus, comprising:
   a Multiple Description Coding (MDC) unit configured to perform MDC on at least one source, and to output a description sequence for the at least one source;
   a Unequal Error Protection (UEP) grouping unit configured to output a UEP description sequence having a different number of description sequences constituting the description sequence according to a UEP level to which an importance level of the at least one source has been reflected;
   a transmission code block processor configured to segment the UEP description sequence, to modulate each segmented UEP description sequence, and to generate a transmission block; and
   an antenna mapping unit configured to duplicate the transmission block, to generate a plurality of the same transmission blocks, and to map the respective transmission blocks to at least one transmission antenna.

2. The transmitter of claim 1, wherein the MDC unit performs MDC on the at least one source in unit of a sub layer that is divided into a base layer and at least one enhanced layer.

3. The transmitter of claim 1, further comprising a systematic raptor coding unit configured to perform systematic raptor coding on each description sequence output from the MDC unit.

4. The transmitter of claim 1, wherein the transmission code block processor comprises:
   a code block segmenting unit configured to segment each UEP description sequence output from the UEP grouping unit to one or more code blocks;
   a Cyclic Redundancy Check (CRC) attaching unit configured to attach a CRC code to each code block;
   a channel coding unit configured to perform channel coding for each code block to which the CRC code has been attached, and to output a channel-coded code block; and
   a modulator configured to modulate each code block output from the channel coding unit, and to generate the transmission block.

5. The transmitter of claim 1, further comprising a pilot inserting unit configured to insert a pilot signal for each of the at least one transmission antenna.

* * * * *